F. S. BOYER.
MOTOR VEHICLE SPOTLIGHT.
APPLICATION FILED MAY 28, 1921.
1,426,250.
Patented Aug. 15, 1922.
2 SHEETS—SHEET 1.
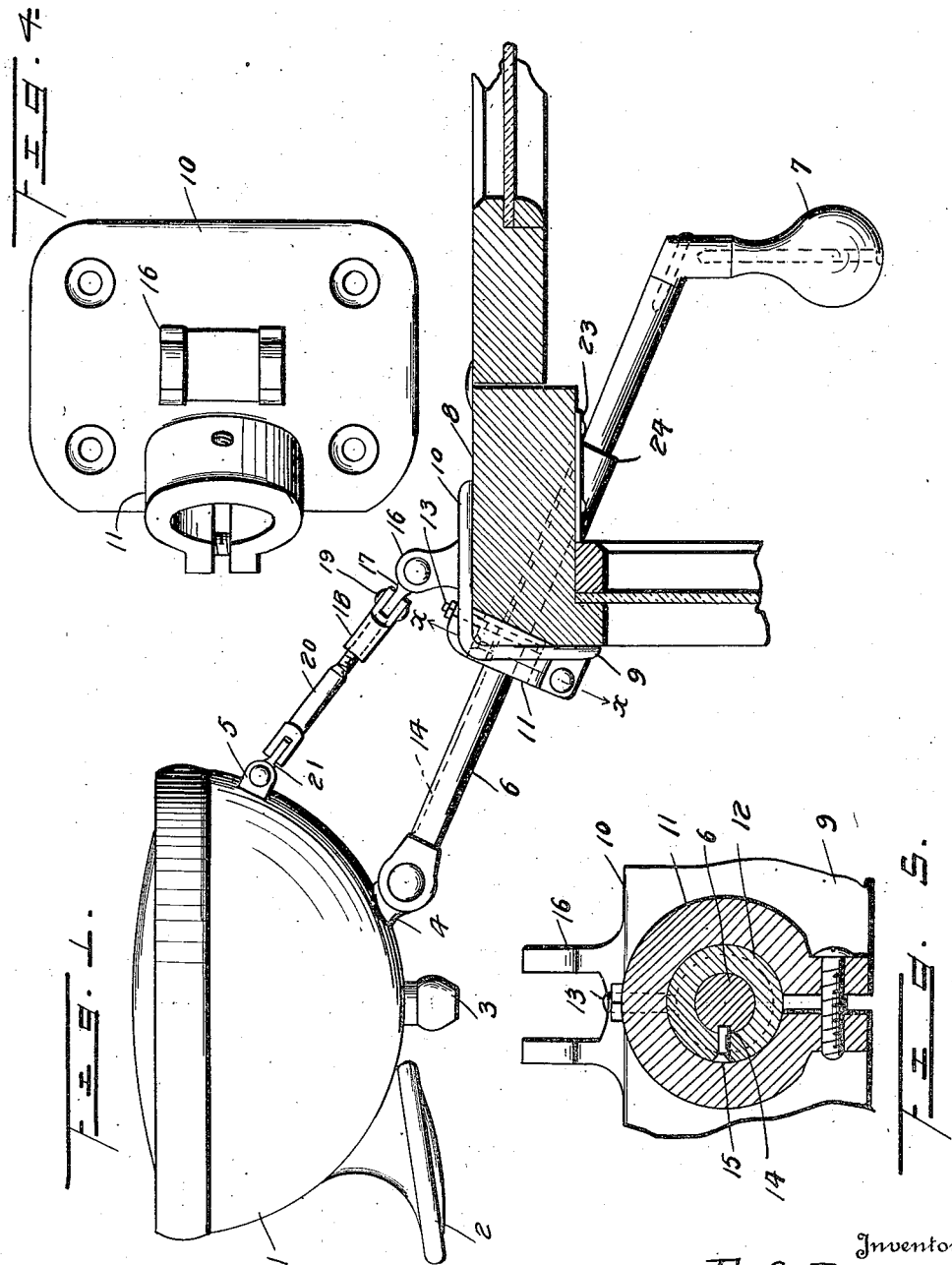
Inventor
F. S. Boyer

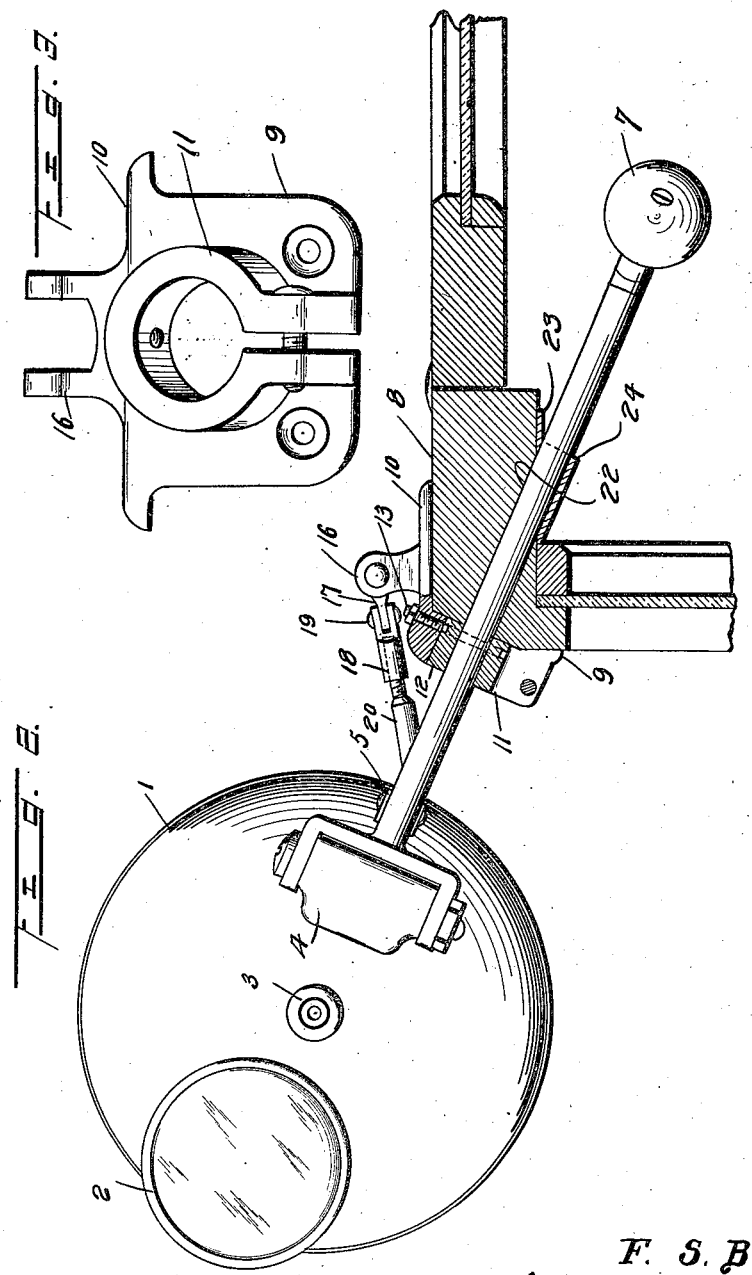

UNITED STATES PATENT OFFICE.

FRED S. BOYER, OF KNIGHTSTOWN, INDIANA.

MOTOR-VEHICLE SPOTLIGHT.

1,426,250.  Specification of Letters Patent.  Patented Aug. 15, 1922.

Application filed May 28, 1921. Serial No. 473,542.

*To all whom it may concern:*

Be it known that I, FRED S. BOYER, a citizen of the United States, residing at Knightstown, in the county of Henry and State of Indiana, have invented certain new and useful Improvements in Motor-Vehicle Spotlights; and I do hereby declare the following to be a full, clear, and exact description of the invention, such as will enable others skilled in the art to which it appertains to make and use the same.

The invention relates to spot lights designed more particularly for automobiles and motor vehicles generally whereby the driver may control the light from the inside of the car when the latter is closed in either by drawn curtains or a winter top.

Other objects and advantages will be apparent and suggest themselves as the nature of the invention is understood.

While the drawings illustrate an embodiment of the invention it is to be understood that in adapting the same to meet different conditions and requirements, various changes in the form, proportion and minor details of construction may be resorted to without departing from the nature of the invention.

Referring to the accompanying drawings forming a part of the specification,

Figure 1 is a top plan view of a spot light embodying the invention, showing the same in operative position, Figure 2 is a view similar to Figure 1 showing the relation of the parts when the lamp has been given a one-quarter turn from the position indicated in Figure 1, and a portion of the corner bracket being broken away, Figure 3 is a side view of the corner bracket, Figure 4 is a front view of the corner bracket, and Figure 5 is a sectional detail on the line $x$—$x$ of Figure 1 with the operating shaft in the relative position indicated in Figure 2.

Corresponding and like parts are referred to in the following description and designated in the several views of the drawings by like reference characters.

The lamp 1 may be of any type or construction usually provided for vehicle head and spot lights. The same is shown as provided with the usual mirrorscope 2. The numeral 3 designates the usual lamp socket for receiving the bulb in a manner well understood. The lamp casing is provided at one side with a knuckle 4 and a bracket 5. A shaft 6 forked at its outer end is pivotally connected to the knuckle 4 by means of the forked element, as indicated most clearly in Figure 2. The shaft 6 is mounted to received a relative longitudinal and axial movement. The inner end of the shaft 6 is provided with a handle 7 which is offset for convenience of manipulating the shaft when adjusting the light to meet existing requirements. The shaft 6 is mounted diagonally in a corner portion of the vehicle, as indicated most clearly in Figures 1 and 2. A bracket is secured to the corner portion 8 of the vehicle and comprises angularly disposed plates 9 and 10 which are secured to the respective sides of the corner portion 8 of the vehicle. The element or plate 9 is split and is formed with an opening having a flange in line therewith forming a collar 11 which receives an annularly grooved ring 12 in which the shaft 6 is slidably mounted, said ring 12 turning freely in the collar 11 and prevented from displacement therefrom by means of a screw or analogous fastening 13 mounted in the collar 11 and entering the annular groove of the ring 12. The shaft 6 is provided in one side with a longitudinal groove or channel 14 which receives the inner end of a screw or like part 15 fitted in an opening formed in the side of a ring 12. It will thus be understood that the shaft 6 and ring 12 turn together in the collar 11, whereas the shaft 6 is free to move longitudinally in the ring 12.

A universal joint connection is interposed between the forward portion of the lamp 1 and the front portion 10 of the corner bracket and comprises a plurality of pivotally connected members. The element or plate 10 is provided with a forwardly extending forked stud 16 which receives the knuckle of a relatively short member 17. A companion member 18 is pivotally connected to the member 17, as indicated at 19, and a relatively long member 20 has screw thread connection with the member 18 and is free to turn therein. A member 21 pivotally connects the outer end of the member 20 with the bracket 5. The pivot connections between the several members have a relative right angular disposition to admit of free movement of the lamp 1 in every position so that a beam of light may be projected in any required direction. This universal joint connection is set well forward of the shaft 6, the parts being so disposed that in one adjusted position a beam of light may be projected straight ahead as indicated in Figure 1. When the parts are in the relative position indicated in Figure 1, rotation of the shaft 6 throws the beam of light upwardly or downwardly as required. Longitudinal movement of the shaft 6 throws the beam of light laterally. It will thus be understood that by properly manipulating the shaft 6, a beam of light may be projected in any required direction. The pivot connections between the several members comprising the universal joint connection have a frictional engagement to prevent a too free movement which would prevent proper support of the lamp in the required adjusted position.

An opening 22 is formed diagonally in the corner portion 8 of the vehicle body to receive the shaft 6 and a plate 23, secured to the inner side of the front portion of the part 8, is apertured to receive the shaft 6 and has a collar 24 in line with the opening to provide an extended bearing for the shaft 6. Thus, it will be understood that the shaft 6 is mounted in inner and outer bearings applied to opposite sides of the corner portion 8 of the vehicle body.

What is claimed is:

1. In combination, a vehicle spot light, a shaft having pivotal connection therewith, a support in which said shaft is mounted for free, independent, rotary and longitudinal movement to angularly adjust the spot light both vertically and laterally, and constraining means wholly independent of the shaft and having pivoted connection with the spotlight and support and having a universal joint in its length.

2. In combination, a vehicle spot light, a plate on the vehicle body, a bearing ring supported by said plate and having swivel connection therewith, a shaft slidable in the bearing ring and rotatable therewith, a spotlight having said shaft connected thereto, and a universal joint connection spaced from the shaft and interposed between the spotlight and vehicle body.

3. In combination, a vehicle spot light, an operating shaft for the spotlight, pivotally connected thereto and mounted diagonally in the corner portion of the vehicle body and having independent longitudinal and rotary movements, and a constraining universal joint connection spaced from said operating shaft and having connection with the forward portion of the spotlight and with the front side of the vehicle body.

4. In combination, a vehicle spot light, a bracket applied to the corner portion of the vehicle body and comprising angularly disposed plates, an operating shaft slidably and rotatably mounted in one of the plates of the bracket, and having connection with the rear portion of the spot light, and a constraining universal joint connection between the forward portion of the spotlight and the forward plate of said corner bracket.

5. In combination, a vehicle spot light, a split bearing plate, a bearing ring mounted in said plate and having a swivel connection therewith, an operating shaft slidable in the bearing ring and rotatable therewith, and having connection with the spotlight, and a constraining universal joint connection between the spotlight and the said bearing plate.

6. In combination, a vehicle spot light, an operating shaft therefor mounted to receive independent slidable and rotatable movement and pivoted thereto, and a constraining universal joint connection for the spotlight spaced from the operating shaft and comprising members having a relative screw thread connection.

In testimony whereof I affix my signature in presence of two witnesses.

FRED S. BOYER.

Witnesses:
R. L. BELL,
E. E. SMITH.